(12) United States Patent
Takayasu (10) Patent No.: US 8,637,766 B2
(45) Date of Patent: Jan. 28, 2014

(54) DYE-SENSITIZED SOLAR CELL

(75) Inventor: Teruki Takayasu, Ikoma (JP)

(73) Assignee: Showa Co., Ltd., Ikoma (JP)

( * ) Notice: Subject to any disclaimer, the term of this patent is extended or adjusted under 35 U.S.C. 154(b) by 203 days.

(21) Appl. No.: 13/147,542

(22) PCT Filed: Feb. 3, 2010

(86) PCT No.: PCT/JP2010/051523
§ 371 (c)(1),
(2), (4) Date: Aug. 2, 2011

(87) PCT Pub. No.: WO2010/090226
PCT Pub. Date: Aug. 12, 2010

(65) Prior Publication Data
US 2011/0284072 A1    Nov. 24, 2011

(30) Foreign Application Priority Data
Feb. 3, 2009  (JP) .................................. 2009-022222

(51) Int. Cl.
*H01L 31/00* (2006.01)
(52) U.S. Cl.
USPC .......................................................... 136/263
(58) Field of Classification Search
USPC ................................................ 136/256, 263
See application file for complete search history.

(56) References Cited

U.S. PATENT DOCUMENTS

| | | | |
|---|---|---|---|
| 6,232,017 B1 * | 5/2001 | Tsuchida et al. | 429/234 |
| 7,235,736 B1 * | 6/2007 | Buller et al. | 136/251 |
| 2003/0040431 A1 * | 2/2003 | Muramatsu | 502/237 |
| 2003/0230337 A1 * | 12/2003 | Gaudiana et al. | 136/256 |
| 2004/0103938 A1 * | 6/2004 | Rider | 136/259 |
| 2005/0011549 A1 | 1/2005 | Miyoshi | |
| 2005/0166957 A1 * | 8/2005 | Imoto et al. | 136/263 |

FOREIGN PATENT DOCUMENTS

| | | |
|---|---|---|
| JP | 2001-266964 A | 9/2001 |
| JP | 2002-075477 A | 3/2002 |
| JP | 2003-123855 A | 4/2003 |
| JP | 2005-032485 A | 2/2005 |
| JP | 2005-240139 A | 9/2005 |
| JP | 3858058 B2 | 9/2005 |
| JP | 2006-324111 A | 11/2006 |
| JP | 2007-109571 A | 4/2007 |
| JP | 2008-021582 A | 1/2008 |
| JP | 2008-084763 A | 4/2008 |

OTHER PUBLICATIONS

International Search Report for International Application No. PCT/JP2010/051523 issued Mar. 9, 2010.

* cited by examiner

*Primary Examiner* — Miriam Berdichevsky
(74) *Attorney, Agent, or Firm* — Edwards Wildman Palmer LLP; James E. Armstrong, IV; Nicholas J. DiCeglie, Jr.

(57) ABSTRACT

This invention provides a dye-sensitized solar cell ensuring high photoelectric conversion efficiency.
The dye-sensitized solar cell comprises a photoelectrode and a counter electrode, which are oppositely disposed with an electrolyte layer interposed therebetween,
wherein:
(1) the photoelectrode is structured such that a semiconductor layer containing a dye sensitizer is formed on a titanium or titanium alloy substrate having an opening structure,
(2) the photoelectrode comprises a light condenser that is disposed on the titanium or titanium alloy substrate.

11 Claims, 3 Drawing Sheets

DYE-SENSITIZED SOLAR CELL

TECHNICAL FIELD

The present invention relates to a dye-sensitized solar cell.

BACKGROUND ART

Monocrystalline silicon solar cells, polycrystalline silicon solar cells, amorphous silicon solar cells, and compound semiconductor solar cells are known examples of solar cells. In recent years, silicon solar cells, such as monocrystalline silicon solar cells or polycrystalline silicon solar cells are mainly used.

However, manufacture of silicon solar cells is costly, as it requires a high-purity silicon material, as well as a high temperature and high-vacuum environment.

Under such circumstances, dye-sensitized solar cells are attracting attention in recent years. The dye-sensitized solar cell has a simple structure and can be easily manufactured; moreover, the material thereof may be selected from various substances. Furthermore, the dye-sensitized solar cell ensures high photoelectric conversion efficiency.

Generally, dye-sensitized solar cells can be manufactured by using a simple method of injecting an electrolyte containing a substance having a reversible electrochemical redox characteristic, such as iodine, between a photoelectrode and a counter electrode, and then connecting the photoelectrode and the counter electrode.

The photoelectrode is generally formed by using the following method. First, a glass substrate having a conductive layer, such as ITO (Indium Tin Oxide) or FTO (Fluorine Tin Oxide), on its surface is coated with a paste containing titanium oxide fine particles. Then, the coated substrate is heat-treated at about 500° C., thereby producing an electrode having a titanium oxide layer. Further, the resulting electrode is immersed in an alcohol solution containing a ruthenium metal complex (dye sensitizer), such as red dye (N719) or black dye (N749), thereby allowing the ruthenium metal complex to adhere to the porous surface of the titanium oxide.

The counter electrode is formed by depositing a catalytic layer (for example, a platinum film), which has a catalytic activity with respect to the substance having an electrochemical redox characteristic, on the glass substrate, on which the conductive layer has been formed, by way of sputtering or the like.

However, in such a dye-sensitized solar cell, an increase in the area of the glass substrates serving as the photoelectrode and the counter electrode (an increase in the area of the conductive layer) increases the electric resistance of the conductive layer, thereby problematically decreasing photoelectric conversion efficiency. Moreover, dye-sensitized solar cells also have problems in that the electric resistance of the conductive layer is also increased by the heat treatment for making a titanium oxide sintered compact, and that the highly corrosive halogen family compound, such as iodine, contained in the electrolyte, corrodes the conductive layer (a durability problem).

In order to solve these problems, a method of forming the substrate of the photoelectrode from a titanium metal is attracting attention.

The use of titanium metal as the substrate of the photoelectrode makes it possible to reduce the increase in electric resistance, compared with hitherto known photoelectrodes that use a glass substrate having a conductive layer. Further, the titanium metal photoelectrode also suppresses the increase in electric resistance due to the heat treatment and gives high corrosion resistance against the highly corrosive halogen family compound, such as iodine, contained in the electrolyte. Accordingly, the use of titanium metal as the substrate of the photoelectrode will provide a constant resistance against iodine or the like for a long period. Moreover, since the titanium metal surface increases the affinity of the titanium oxide layer for the titanium substrate surface, a desirable flow of electrons can be expected.

However, because the titanium metal basically lacks light permeability, when the titanium metal is used as the substrate of the photoelectrode, the light must be incident on the counter electrode having light permeability. To emit light onto the counter electrode, the light must first permeate the electrolyte layer, which contains the catalytic layer and iodine, etc., provided on the counter electrode. Consequently, the light amount decreases by the time the light reaches the photoelectrode. This results in insufficient photoelectric conversion efficiency.

Patent Document 1, which was previously reported by the present inventors, discloses an example of application of titanium to a photoelectrode of a dye-sensitized solar cell. First, a titanium nitride is formed on a titanium surface, and the titanium is then subjected to application of a voltage greater than the spark discharge voltage in an electrolyte that has an etching property with respect to titanium, thereby forming an anatase titanium oxide film. However, since this solar cell has a drawback in that the light amount decreases by the time the light reaches the photoelectrode, there has been a demand for further increasing the photoelectric conversion efficiency of solar cells.

To solve this problem, a photoelectrode formed of a titanium mesh has been proposed. More specifically, Patent Document 2 uses a metallic grid with an opening area of 50 to 95% of the entire metal, thereby enabling light to be directly incident on the photoelectrode. Further, Patent Document 3 also discloses a structure of enabling light to be directly incident on the photoelectrode, using a titanium metal mesh having an opening area of 60% or greater.

However, although the solar cells of Patent Documents 2 and 3 made it possible to allow the light to be incident on the photoelectrode, the photoelectric conversion efficiency was still insufficient. In the solar cells of Patent Documents 2 and 3, it is necessary to ensure a large opening area to improve the light retrieval amount; accordingly, the area of the semiconductor layer, which is made of, for example, a titanium oxide modified with a dye sensitizer, decreases. This results in a decrease in photoelectric conversion efficiency.

CITATION LIST

Patent Documents

Patent Document 1: Japanese Patent No. 3858058
Patent Document 2: Japanese Unexamined Patent Publication No. 2003-123855
Patent Document 3: Japanese Unexamined Patent Publication No. 2006-324111

SUMMARY OF INVENTION

Technical Problem

An object of the present invention is to provide a dye-sensitized solar cell that ensures high photoelectric conversion efficiency.

Technical Solution

The inventors of the present invention conducted extensive research to solve the above problems of prior art and found that the above object of the present invention can be accomplished by using a dye-sensitized solar cell having a specific structure. With this finding, the inventors completed the present invention.

Specifically, the present invention relates to the following dye-sensitized solar cells.

Item 1

A dye-sensitized solar cell comprising a photoelectrode and a counter electrode, which are oppositely disposed with an electrolyte layer interposed therebetween, wherein:

(1) the photoelectrode is structured such that a semiconductor layer containing a dye sensitizer is formed on a titanium or titanium alloy substrate having an opening structure, (2) the photoelectrode comprises a light condenser that is disposed on the titanium or titanium alloy substrate.

Item 2

The dye-sensitized solar cell according to Item 1, wherein a fiber member or a glass rod material is embedded in the titanium or titanium alloy substrate having an opening structure.

Item 3

The dye-sensitized solar cell according to Item 1 or 2, wherein the titanium or titanium alloy substrate having an opening structure is a metal mesh or a lath material.

Item 4

The dye-sensitized solar cell according to any one of Items 1 to 3, wherein the light condenser comprises a light-condensing unit for condensing sunlight and a transmission unit for transmitting condensed sunlight to the photoelectrode.

Item 5

The dye-sensitized solar cell according to any one of Items 1 to 4, wherein the semiconductor layer is a titanium oxide film formed by anodizing the titanium or titanium alloy substrate having an opening structure.

Item 6

The dye-sensitized solar cell according to Item 5, wherein the titanium or titanium alloy substrate having an opening structure comprising a titanium nitride, which is formed before the anodization.

Item 7

The dye-sensitized solar cell according to any one of Items 1 to 4, wherein the semiconductor layer is a titanium oxide sintered compact obtained by forming a coating film by applying a paste agent containing titanium oxide fine particles onto the titanium or titanium alloy substrate having an opening structure, and heat-treating the coating film.

Item 8

The dye-sensitized solar cell according to any one of Items 1 to 4, wherein the semiconductor layer is a laminated body of a titanium oxide sintered compact and a titanium oxide film, the laminated body being obtained by forming a titanium oxide film by anodizing the titanium or titanium alloy substrate having an opening structure, forming a coating film by applying a paste agent containing titanium oxide fine particles onto the titanium oxide film, and heat-treating the coating film.

The dye-sensitized solar cell of the present invention is a dye-sensitized solar cell comprising a photoelectrode and a counter electrode, which are oppositely disposed with an electrolyte layer interposed therebetween, wherein:

(1) the photoelectrode is structured such that a semiconductor layer containing a dye sensitizer is formed on a titanium or titanium alloy substrate having an opening structure, (2) the photoelectrode comprises a light condenser, which is disposed on the titanium or titanium alloy substrate having an opening structure while being connected thereto.

The dye-sensitized solar cell according to the present invention is structured such that a light condenser is provided on the titanium or titanium alloy substrate having an opening structure (i.e., on the surface of the photoelectrode), thereby ensuring high photoelectric conversion efficiency. More specifically, the present invention significantly increases the photoelectric conversion efficiency with some specific arrangements, such as allowing sunlight or the like condensed by the light-condensing member to pass through the openings of the titanium metal or titanium alloy substrate via a transmission unit, or by efficiently reflecting the light by the counter electrode.

The dye-sensitized solar cell according to the present invention may be in the form of a module comprising multiple batteries.

Light Condenser

The light condenser is a device for collecting sunlight or the like and transmitting the light to a photoelectrode. The light condenser is disposed on the side of the titanium or titanium alloy substrate having an opening structure (i.e., the opposite side of the semiconductor layer) of the photoelectrode. Any known light condensers usable for silicon solar cells or the like may be used as the light condenser, insofar as the effect of the present invention is not impaired.

A preferable light condenser is one comprising a light-condensing unit and a transmission unit for transmitting the collected sunlight or the like to the photoelectrode.

Examples of the light-condensing units include a converging lens, a light reflector, and a prism.

Figure 4:
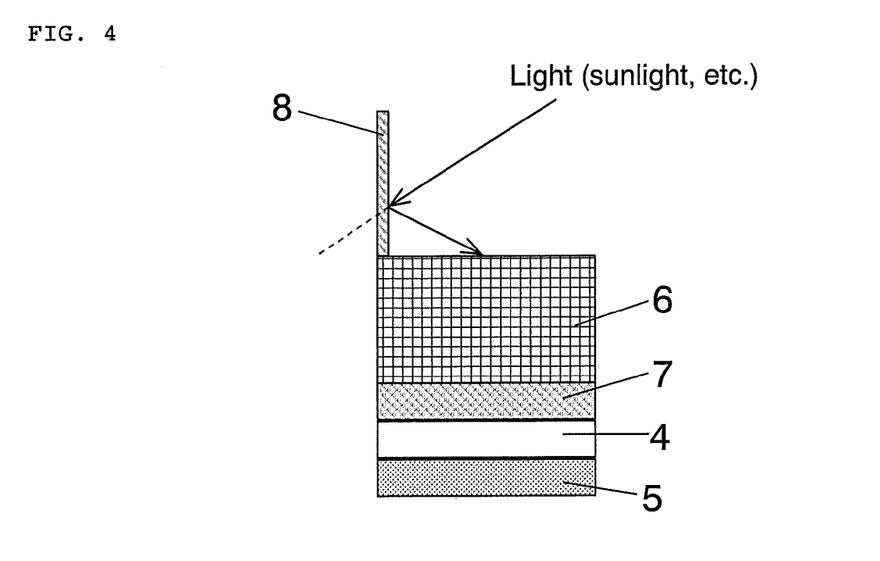
FIG. 4: A drawing (schematic cross-sectional view) showing an example of a dye-sensitized solar cell according to the present invention using a reflector as a light-condensing unit.

When a reflector is used as the light-condensing unit, for example, as shown in FIG. 4, the reflector is so disposed as to allow the sunlight or the like reflected thereby (via the transmission unit, if provided) to reach the photoelectrode.

A known reflector may be used as the reflector. Examples of the reflectors include those with vapor-deposited metals, such as silver or aluminum, and metal plates containing those metals.

Figure 5:
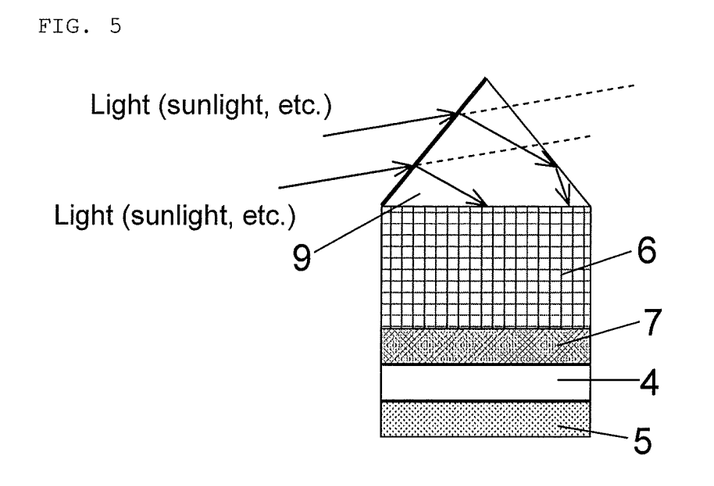
FIG. 5: A drawing (schematic cross-sectional view) showing an example of a dye-sensitized solar cell according to the present invention using a prism as a light-condensing unit.

When using a prism as the light-condensing unit, for example, as shown in FIG. 5, a triangle prism formed of a transparent material, in which one of the surfaces is provided with a photoelectrode (or a transmission unit, if provided), may be used. In the prism, the sunlight or the like that is incident on the light-receiving surface into the prism is refracted by the light-receiving surface (via the transmission unit, if provided), thereby reaching the photoelectrode. Further, even if the sunlight or the like reflected by the light-receiving surface cannot reach the photoelectrode, it will undergo total reflection with another light-receiving surface, thereby reaching the photoelectrode.

Any known prism can be used as the prism. Examples thereof include various transparent materials, such as glass, acrylic resin, polycarbonate resin, polyolefin resin, and polyethylene terephthalate resin.

The light-condensing unit may be formed of a combination of the reflector and the prism. If it is so formed, the surfaces of the prism serve as a light-receiving surface, a reflection surface (reflector), and a surface having a photoelectrode (or as a transmission unit, if provided), respectively.

When a converging lens is used as the light-condensing unit, a lens having a light incident surface and a light emission surface may be used. For example, when using a convex lens, sunlight or the like is condensed after passing through the light incident surface, and then is released from the light emission surface of the convex lens, thereby collecting the entire sunlight or the like to the photoelectrode. The converging lens of the present invention is not limited and may have variable forms (including concave lenses) insofar as it has a light-condensing property for sunlight or the like.

Any known lens can be used as the converging lens. Examples thereof include acrylic resin, polyethylene terephthalate (PET), polycarbonate resin, and glass.

An example of a suitable material of the transmission unit is an optical fiber. Examples of optical fibers include those having a core portion and a clad portion, the optical fibers being formed from a material selected from the group consisting of silica-based fibers produced by a vapor-phase axial deposition method (VAD method), modified chemical vapor deposition (MCVD method), chemical vapor deposition method (CVD method), plasma process, or the like; or formed from plastic fibers, such as polymethylmethacrylate (PMMA), polystyrene, or deuterated polymethylmethacrylate (DPMMA).

The transmission unit is disposed by being connected with the titanium or a titanium alloy substrate having an opening structure of the present invention (on the opposite side of the semiconductor layer) through a known connecting technique. Further, it can also be connected by using a technique of welding the transmission unit and a fiber member, such as silica-based fiber (described later), polymethylmethacrylate (PMMA), polystyrene, or deuterated polymethyl methacrylate (DPMMA); or welding a glass rod material embedded in the titanium or titanium alloy substrate having an opening structure.

The light condenser may have any structure insofar as the light-condensing unit and the transmission unit are connected, and any known structure of light condenser may be adopted. Any known technique can be used to connect the light-condensing unit and the transmission unit. For example, as shown in FIG. 4 and FIG. 5, the light-condensing unit and the transmission unit may be connected directly, or fixed via a casing (having an internal face as a reflection surface or a refraction surface), a light pipe, or the like. Such direct connection and indirect connection are both acceptable insofar as the sunlight or the like is efficiently transmitted to the photoelectrode by the light-condensing unit. The shape and size of the light-condensing unit, and the diameter and the number of the optical fibers used as the transmission unit may be appropriately determined according to the scale, etc., of the solar cell.

Photoelectrode

The photoelectrode of the dye-sensitized solar cell according to the present invention is configured such that a semiconductor layer containing a dye sensitizer is formed on a metal mesh or a lath material formed of titanium or a titanium alloy. The dye-sensitized solar cell according to the present invention synergistically increases photoelectric conversion efficiency by comprising a light condenser on the photoelectrode containing a metal mesh or a lath material formed of titanium or a titanium alloy.

The thickness of the photoelectrode is generally about 0.1 to 10 mm, preferably about 1 to 5 mm.

Titanium or a Titanium Alloy Substrate Having an Opening Structure

Examples of titanium alloys include Ti-6Al-4V, Ti-0.5Pd, Ti-5Al-2.5Sn, Ti-3Al-2.5V, Ti-6Al-2Cb-1Ta-1Mo, Ti-8Al-1Mo-1V, Ti-6Al-2Sn-4Zr-2Mo, Ti-6Al-6V-2Sn, Ti-6Al-2Sn-4Zr-6Mo, and Ti-13V-11Cr-3Al.

A metal mesh or a lath material (for example, a metal lath or a wire lath) may be used as the titanium or titanium alloy substrate having an opening structure.

The present specification more specifically explains the dye-sensitized solar cell according to the present invention below with reference to an example using a titanium metal mesh as a typical example of the recited "titanium or a titanium alloy substrate having an opening structure".

The opening ratio of the titanium metal mesh (hereinafter occasionally referred to as a "titanium mesh") is preferably about 10 to 95%, more preferably about 10 to 45%. In particular, when the opening ratio is about 45%, the semiconductor layer can be more easily formed on the titanium mesh. The opening ratio of the titanium mesh can be easily measured according to a known method.

The titanium mesh can be easily obtained through known manufacturing methods or as a commercial product. The titanium mesh is manufactured, for example, by using a method of weaving a titanium wire. The lath material is manufactured, for example, by using a method of making multiple cuts (holes) on a titanium plate, and then pulling the plate from its two ends.

The wire diameter of the titanium mesh is not limited. The wire diameter is generally about 0.01 to 2 mm, preferably about 0.1 to 2 mm, when the titanium mesh is made by weaving a titanium wire; and is generally about 0.1 to 10 mm, preferably about 0.5 to 5 mm when the titanium mesh is manufactured by using a method of making multiple cuts (holes) on a titanium plate, and then pulling the plate from its two ends.

The wire diameter corresponds to the thickness of the titanium mesh.

Semiconductor Layer Containing a Dye Sensitizer

Examples of components of the semiconductor layer include metal oxides, such as titanium oxide, zinc oxide, tin oxide, niobium oxide, or tungstic oxide. These oxides may be used singly or in a combination of two or more. The titanium oxide is particularly preferable.

When the titanium oxide layer is formed as the semiconductor layer, it is preferable to adopt (1) a method of anodizing the titanium mesh or a lath material, thereby forming a titanium oxide layer (titanium oxide coat) on a titanium mesh or a lath material, or (2) a method of applying a paste agent containing titanium oxide fine particles on the titanium mesh, and then heat-treating the coating film, thereby forming a titanium oxide sintered compact (a layer-shaped titanium oxide sintered compact), more specifically, heat-treating a coating film formed by applying a fiber member generally used for a plastic fiber, such as silica-based fiber, polymethylmethacrylate (PMMA), polystyrene, or deuterated polymethyl methacrylate (DPMMA), or a coating film obtained by applying a titanium oxide on a titanium mesh or a lath material in which a glass rod material is embedded, thereby forming a titanium oxide sintered compact (a layer-shaped titanium oxide sintered compact).

Figure 1:
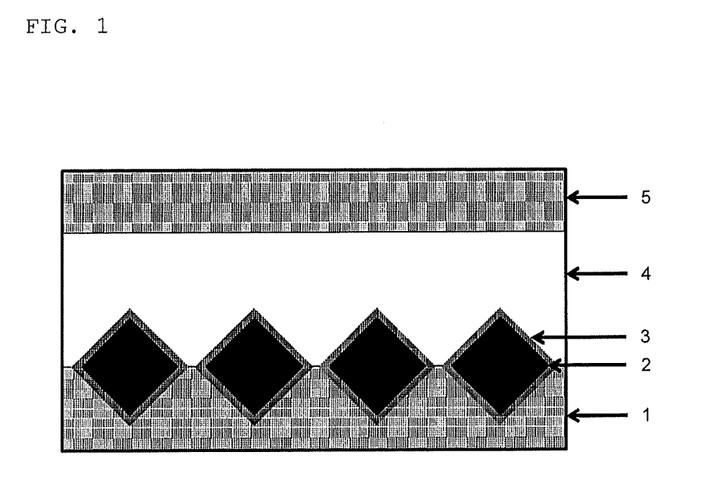
FIG. 1: A drawing (schematic cross-sectional view) showing an example of a dye-sensitized solar cell according to the present invention.
Figure 2:
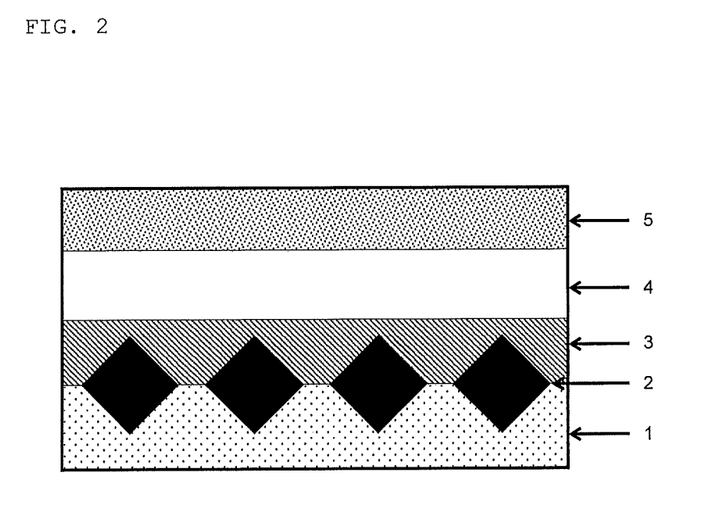
FIG. 2: A drawing (schematic cross-sectional view) showing an example of a dye-sensitized solar cell according to the present invention.

The dye-sensitized solar cell shown in FIG. 1 is manufactured by using the method (1). The dye-sensitized solar cell shown in FIG. 2 is manufactured by using the method (2).

Although the titanium oxide layer shown in FIG. 1 is formed on the two sides of the titanium mesh or the lath material, it is also possible to form the titanium oxide layer on only one side (the side in contact with the electrolyte layer) of the titanium mesh or the lath material. Further, although the titanium oxide layer shown in FIG. 2 is formed on only one side (the side in contact with the electrolyte layer), the titanium oxide layer may be formed on the two sides (the side in contact with the light condenser and the side in contact with the electrolyte layer) of the titanium mesh or the lath material.

Further, when the electrolyte layer is in the form of a liquid, which may elute off through the titanium mesh or the lath material, the leakage can be prevented by embedding a fiber member generally used for a plastic fiber, such as silica-based fiber, polymethylmethacrylate (PMMA), polystyrene, or deuterated polymethyl methacrylate (DPMMA), or a glass rod material in the titanium mesh or the lath material. With this configuration, the titanium mesh or the lath material is efficiently connected with the fiber member or the glass rod material embedded in the titanium mesh or the lath material, thereby efficiently connecting the fiber member or the glass rod material with the transmission unit. Therefore, the sunlight or the like condensed by the light-condensing unit can be incident on the dye sensitizer of the semiconductor layer. Accordingly, high photoelectric conversion efficiency can be ensured even when the opening ratio of the mesh or the lath material is high.

It is particularly preferable to use the same material as that of the transmission unit, which ensures high photoelectric conversion efficiency, as the fiber member or the glass rod material embedded in the titanium mesh.

Method (1)

The anodization is performed, for example, by using a method of immersing a titanium mesh or a lath material in an electrolyte containing at least one acid selected from inorganic acids and organic acids having an etching effect, and applying a voltage greater than the spark discharge voltage. The anodization appropriately forms the anatase titanium oxide film, thereby ensuring high photoelectric conversion efficiency.

It is also possible to form a titanium nitride on the titanium mesh or the lath material before the titanium mesh or the lath material is immersed in the electrolyte.

For example, Method (1) comprises the following Steps (i) and (ii).

(i) forming a titanium nitride on the surface of a titanium mesh or a lath material; and (ii) immersing the titanium mesh obtained in Step (i) in an electrolyte containing at least one acid selected from inorganic acids and organic acids having an etching effect on the titanium mesh or the lath material, and applying a voltage greater than the spark discharge voltage, thereby performing anodization.

Step (i)

Step (i) forms a titanium nitride on the surface of a titanium mesh or a lath material.

In Step (i), a titanium nitride layer is formed on a titanium mesh or a lath material with a thickness of generally about 0.1 to 100 μm, preferably about 0.5 to 50 μm, more preferably about 1 to 30 μm.

The thickness of the titanium nitride may be measured by cross-section observation using a laser microscope or a scanning electron microscope (SEM) or an eddy current film thickness measure (product name: EDY-I, Sanko Electronic Laboratory Co., Ltd.)

The thicknesses of the titanium oxide film, the electrolyte layer, and the platinum film, which are described later, are also measured by using the same method.

The method of forming a titanium nitride on the surface of the titanium mesh or the lath material is not particularly limited. For example, it is possible to perform heat treatment, ion plating treatment, sputtering treatment, thermal CVD, plasma CVD, laser CVD, flame spraying, electric arc spraying, plasma spraying, laser spraying or the like in a nitrogen atmosphere or in an ammonia atmosphere. In particular, in view of convenience, mass production, and manufacturing costs, a method of heat-treating a titanium mesh or a lath material in a nitrogen gas atmosphere is preferable.

An example of heat treatment of the titanium mesh or the lath material in the nitrogen gas atmosphere is a method of heating a titanium material in the nitrogen gas atmosphere, generally at 750 to 1150° C., preferably at 950 to 1150° C. The nitrogen gas atmosphere for the heat treatment is not particularly limited. The nitrogen gas atmosphere is made by specifying the atmospheric pressure of the nitrogen gas to generally 0.01 to 100 MPa, preferably 0.1 to 10 MPa, more preferably 0.1 to 1 MPa. The time for heating the titanium mesh or the lath material is generally 1 to 12 hours, preferably 2 to 8 hours, more preferably 3 to 6 hours.

In the method of Step (i), the type of titanium nitride formed on the titanium mesh or the lath material is not particularly limited. Examples of the titanium nitrides include TiN, $Ti_2N$, $\alpha\text{-}TiN_{0.3}$, $\eta\text{-}Ti_3N_{2-X}$, $\zeta\text{-}Ti_4N_{3-X}$ (x representing, however, an integer from 0 to less than 3), mixtures thereof, and an amorphous titanium nitride. Among these, TiN, $Ti_2N$, and mixtures thereof are preferable, TiN or a mixture of TiN and $Ti_2N$ are further preferable, and TiN is particularly preferable.

In the present invention, the formation of the titanium nitride may be performed by one of the above methods or a method combining two or more of the above methods. Among the above methods for forming the titanium nitrides, the method of heat-treating the titanium material in a nitrogen gas atmosphere is preferable in terms of convenience, mass production, and manufacturing costs.

Step (ii)

Step (ii) carries out anodization by immersing the titanium mesh or the lath material obtained in Step (1) in an electrolyte containing at least one acid selected from inorganic acids and organic acids having an etching effect on the titanium mesh or the lath material, and applying a voltage greater than the spark discharge voltage.

The anodization in Step (ii) uses, as an electrolyte, an aqueous solution containing an inorganic acid and/or an organic acid having an etching effect on the titanium mesh or the lath material. Examples of the inorganic acids having an etching effect on the titanium mesh or the lath material include sulfuric acid, phosphoric acid, hydrofluoric acid, hydrochloric acid, nitric acid, and aqua regia. Examples of the organic acids having an etching effect on the titanium mesh or the lath material include oxalic acid, formic acid, citric acid, and trichloro acetic acid. Among these, sulfuric acid, phosphoric acid, hydrochloric acid, oxalic acid, and trichloro acetic acid are preferable, and sulfuric acid are further preferable. The acids may be used singly or in any combination of a plurality of kinds of organic acids and the inorganic acids. A preferable example of the electrolyte containing two or more organic/inorganic acids is a solution containing a sulfuric acid and a phosphoric acid.

The proportion of the acid in the electrolyte is determined according to the type of the acid and the anodization conditions. Generally, the proportion of the total amount of the above acids is 0.01 to 10 M, preferably 0.1 to 10 M, more preferably 1 to 10 M. An example is an electrolyte containing 1 to 8 M of a sulfuric acid and 0.1 to 2 M of a phosphoric acid.

The electrolyte preferably contains a hydrogen peroxide in addition to the organic acid and/or inorganic acid. The incorporation of hydrogen peroxide in the electrolyte makes it possible to more efficiently produce an anatase titanium oxide film. The proportion of hydrogen peroxide in an electrolyte is not particularly limited; for example, the proportion is 0.01 to 5 M, preferably 0.01 to 1 M, more preferably 0.1 to 1 M.

An example of a preferable electrolyte solution used in the anodization in Step (ii) is an aqueous solution containing 1 to 8 M of sulfuric acid, 0.1 to 2 M of phosphoric acid, and 0.1 to 1 M of hydrogen peroxide.

In Step (i), the titanium mesh or the lath material obtained above was immersed in the electrolyte, and anodization was performed by applying a voltage at or greater than the spark discharge voltage, thereby forming anatase titanium oxide film.

The anodization is performed by applying a voltage at or greater than the spark discharge voltage. Generally, a voltage of 100 V or more, preferably 150 V or more, is applied.

The anodization may be performed, for example, by increasing a voltage to the spark discharge voltage at a constant increase rate and carrying out the application for a certain duration with a voltage at or greater than the spark discharge voltage. The voltage increase rate to the spark discharge voltage is generally 0.01 to 1 V/second, preferably 0.05 to 0.5 V/second, more preferably 0.1 to 0.5 V/second. Further, the duration of the voltage application at or greater than the spark discharge voltage is generally at least one minute, preferably 1 to 60 minutes, more preferably 10 to 30 minutes.

The above anodization using spark discharge may also be performed by controlling a current instead of controlling a voltage. More specifically, the anodization by spark discharge may be performed under an electrolyte temperature of about 10 to 50° C., a current density of about 0.5 to 5 A/dm$^2$, and an electrolysis time of about 10 to 60 minutes.

The anodization may be performed by known methods other than the spark discharge. If it is so performed, it is preferable to perform a heat treatment after the anodization. The temperature of heat treatment is preferably about 300 to 800° C., more preferably about 400 to 700° C. The duration of heat treatment may be suitably set according to the heat-treatment temperature. The heat treatment is performed in an oxidizing atmosphere (for example, in air).

The anatase titanium oxide film resulting from the above production process has a film thickness of about 1 to 100 μm.

Method (2)

The average particle diameter of the titanium oxide fine particles is preferably about 0.5 to 100 nm, more preferably about 2 to 30 nm.

The paste agent may be prepared, for example, by dispersing the titanium oxide fine particles in a solvent. A preferable example of the solvent is polyethylene glycol. The amount of the titanium oxide fine particles in the paste agent is not particularly limited and may be suitably adjusted to ensure appropriate formation of a sintered compact.

The method of applying the paste agent onto the titanium mesh or the lath material is not particularly limited. Examples of the methods include screen printing, ink-jet printing, roll coating, doctor blade coating, and spray coating.

Further, the application of the paste agent onto the titanium mesh or the lath material may fail when the paste agent passes through the sieve openings of the titanium mesh or the lath material. In this case, a fiber member used for, for example, a plastic fiber, such as silica-based fiber, polymethylmethacrylate (PMMA), polystyrene, or deuterated polymethyl methacrylate (DPMMA), or a glass rod material may be embedded in the titanium mesh or the lath material to prevent the paste agent from passing through the sieve openings. The method of embedding the fiber member or the glass rod material in the titanium mesh or the lath material may be performed according to a known method, for example, a method of first dissolving polymethylmethacrylate, polystyrene or like plastics, or a glass rod material, immersing the titanium or titanium alloy substrate having an opening structure in the fluid, and cooling the glass or treating it in a high vacuum to make it adhere to the titanium or a titanium alloy substrate (airtight adhesion); alternatively, the embedding may be performed by frit sealing using a frit glass material.

A single kind or a plurality of kinds of fiber members or glass rod materials may be used.

The thickness of the coating film is not particularly limited. The thickness is appropriately determined so that the resulting titanium oxide sintered compact has a desired thickness.

The coating film may be formed on the titanium oxide film formed by anodization of Method (1). If it is so formed, a laminated body of the titanium oxide sintered compact and the titanium oxide film can be obtained as a semiconductor layer.

The temperature of the heat treatment is preferably about 100 to 600° C., more preferably about 400 to 500° C. In particular, titanium oxide fine particles are desirably sintered by heating at about 400 to 500° C. The duration of heat treatment is appropriately determined according to the temperature of the heat treatment. The heat treatment is performed in an oxidizing atmosphere (for example, in air).

The dye sensitizer is not limited insofar as it is a dye having absorption spectra in the infrared light range, visible light range, and/or ultraviolet light range. Examples of dye sensitizers include ruthenium metal complexes, such as red dye (N719) or black dye (N749); metal complexes other than ruthenium, such as copper phthalocyanine; and organic dyes, such as eosine, rhodamine, or merocyanine. These dye sensitizers can be used singly or in combination of two or more. Among these, a ruthenium metal complex is particularly preferable.

The dye sensitizer is made to adhere (through chemisorption, physisorption, or deposition) to the semiconductor layer so as to be incorporated in the semiconductor layer. The adhesion can be performed by, for example, immersing a semiconductor layer in a solution containing a dye sensitizer.

Insofar as the effect of the present invention is not impaired, the amount of the dye sensitizer to be adhered to the semiconductor layer may be appropriately determined according to the area of the semiconductor layer, etc.

Electrolyte Layer

The electrolyte layer may be any layer capable of reducing the dye resulting from photoexcitation and electronic injection into the semiconductor.

Insofar as the effect of the present invention is not impaired, the thickness of the electrolyte layer, i.e., the distance between the photoelectrode and the counter electrode may be appropriately determined. The thickness is generally about 1 to 3000 μm.

Examples of the electrolyte layer include a liquid electrolyte layer containing an electrolyte and a gel-type electrolyte layer and a solid electrolyte layer obtained by semi-solidifying a liquid electrolyte layer by addition of a gelling agent.

Examples of the liquid electrolyte layer include nonaqueous electrolyte containing redox species. Examples of redox species include a combination of iodine and metal iodine, such as LiI, NaI, KI, or CaI$_2$, and a combination of bromine and metal bromide, such as LiBr, NaBr, KBr, or CaBr$_2$. These metal iodines and metal bromides can be used singly or in combination of two or more. Examples of the solvents include acetonitrile, methoxynitrile, propionitrile, ethyl carbonate, and propion carbonate. These substances for solvents can be used singly or in combination of two or more.

Examples of gel-type electrolyte layers include those obtained by gelatinizing the nonaqueous electrolyte by addition of a polymer or the like.

Examples of solid electrolyte layers include known electrolytes for solar cells made of a conductive material capable of electron, hole, and ion transport. Examples thereof include hole transport materials, such as polycarbazole or triphenylamine; electron transport materials, such as tetra nitro fluorenone; conductive polymers, such as poly-roll; solid electrolyte compositions obtained by solidifying the nonaqueous electrolyte solution using known polymer compounds or fine particles; and P-type semiconductors, such as copper iodide or copper thiocyanate.

It is more desirable to use gel-type electrolyte layers or solid electrolyte layers, which suffer no leakage of electrolyte.

When a liquid electrolyte layer is used, it is preferable to provide separators in the boundary region of the electrolyte layer and the photoelectrode (the semiconductor layer), and the boundary region of the electrolyte layer and a counter electrode (described later). Any known separator generally used in the field of batteries may be used. The thickness and the area of the separator are not particularly limited and are appropriately determined according to the scale of the desired solar cell.

Counter Electrode

The counter electrode is not limited and may be selected from known electrodes for dye-sensitized solar cells.

Examples of the materials for forming the counter electrode include metals, such as platinum, gold, silver, copper, aluminum, rhodium, or indium; carbon; and conductive metal oxides, such as ITO or FTO.

For example, when a liquid-form electrolyte layer is used as the electrolyte layer, the liquid-form electrolyte layer preferably comprises a supporting base formed from the aforementioned metals or metal oxides, and a film formed on the supporting base that exhibits a catalytic activity in the reaction of the redox species (reversible electrochemical redox reaction). A platinum film with a thickness of about 0.001 to 2 μm is preferable. The supporting base is preferably formed from ITO.

Titanium is also a preferable material of the counter electrode. For example, when a liquid-form electrolyte layer is used as an electrolyte layer, the titanium counter electrode suffers no corrosion due to the redox species (such as iodine, which is a highly-corrosive halogen-family compound) contained in the electrolyte layer.

Moreover, it is preferable to use a mirror-finished counter electrode that efficiently reflects light emitted from a light condenser and thereby allows the light to be efficiently incident on the titanium oxide layer containing a dye adhered thereto. A known method may be used for the mirror-finishing treatment of the electrode. The mirror-finishing treatment is performed to the extent which the photoelectric conversion efficiency as a solar cell does not degrade.

Process for Producing Dye-Sensitized Solar Cell

The dye-sensitized solar cell according to the present invention may be produced according to a known method, except for the provisions of the light condenser, the photoelectrode, etc. For example, the solar cells of FIG. 1 and FIG. 2 are formed by oppositely disposing the photoelectrode (2+3) and the counter electrode 5 via a spacer (not shown), injecting the electrolyte layer between the photoelectrode and the counter electrode, and disposing the light condenser 1 on the photoelectrode (on the titanium oxide layer in the cell of FIG. 1, and on the titanium mesh or the lath material 2 in the cell of FIG. 2).

The method of injecting the electrolyte layer is not limited and may be performed, for example, as follows. After the counter electrode is formed above the semiconductor layer of the photoelectrode, an inlet is formed and an electrolyte-layer-forming material is injected through the inlet. The inlet is closed with a predetermined member or by heating after the injection of the material is completed. Upon injection, when using a gel-type electrolyte layer, for example, the gel electrolyte is fluidified by heating. When using a solid electrolyte layer, for example, the solid electrolyte is dissolved in a solvent capable of dissolving the solid electrolyte, and the resulting fluid is injected through the inlet, and then the solvent is removed.

Advantageous Effects of Invention

The present invention synergistically increases the photoelectric conversion efficiency by adopting a titanium or a titanium alloy substrate having an opening structure as a member for forming a photoelectrode, and also providing a light condenser on the photoelectrode. In particular, the dye-sensitized solar cell according to the present invention desirably retains high photoelectric conversion efficiency even when the electrodes (photoelectrode and counter electrode) have large areas.

DESCRIPTION OF EMBODIMENTS

The present invention is more specifically explained below in reference to the Examples. The present invention is, however, not limited to those examples.

Example 1

Production of Photoelectrode

A titanium mesh having a wire diameter of 2 mm, thickness of 2 mm, area of 1 $cm^2$ (1 cm×1 cm), and opening ratio of 45% was prepared.

A titanium nitride layer having a thickness of about 2 μm was formed on the surface of the titanium mesh by using PVD treatment with ion plating. The resulting coating layer was subjected to anodization by being immersed in an acid mixture bath (electrolyte) containing 1.5 M sulfuric acid, 0.3 M phosphoric acid, and 0.3 M hydrogen peroxide under an elevated voltage at a rate of 0.1 V/seconds. The voltage level was retained for 10 minutes after reaching 200 V. As a result, an anatase titanium oxide film (semiconductor layer) having a thickness of about 10 μm was formed on the titanium mesh (both sides).

The resulting laminated body (titanium mesh and semiconductor layer) was immersed in a mixed liquid of acetonitrile and butanol (volume ratio 1:1) containing 0.0003 M of N719 (dye sensitizer), thereby modifying the titanium oxide coating with N719.

Preparation of Electrolyte Layer

Potassium iodine, iodine, tetrabutylammonium (TBP) and organic iodine salt (1-propyl-2,3-dimethyl imidazolium iodide) were dissolved in acetonitrile (solvent) to prepare a solution (electrolyte) of 0.1 M potassium iodide, 0.05 M iodine, 0.5 M tetrabutyl ammonium (TBP), and 0.6 M organic iodine salt.

Counter Electrode

A platinum film having a thickness of 50 nm was formed on an ITO plate by sputtering, thereby forming a counter electrode having a thickness of 2 μm and an area of 1 $cm^2$.

Production of Dye-Sensitized Solar Cell

The photoelectrode and the counter electrode were oppositely disposed via an insulating spacer having a thickness of 100 μm. Immediately after injecting the electrolyte between the photoelectrode and the counter electrode so that the electrolyte layer would have a thickness of 100 μm, the inlet was sealed with an ultraviolet-curable resin. Thereafter, a known light condenser (shown in FIG. 4) was placed on the photoelectrode.

Example 2

A dye-sensitized solar cell was produced in the same manner as in Example 1 except that a glass rod material was embedded in the titanium mesh.

Comparative Example 1

A dye-sensitized solar cell was produced in the same manner as in Example 1 except that a titanium plate having a thickness of 2 mm and an area of 1 cm² (1 cm×1 cm) was used instead of the titanium mesh.

Test Example 1 (Performance Test)

Figure 3:
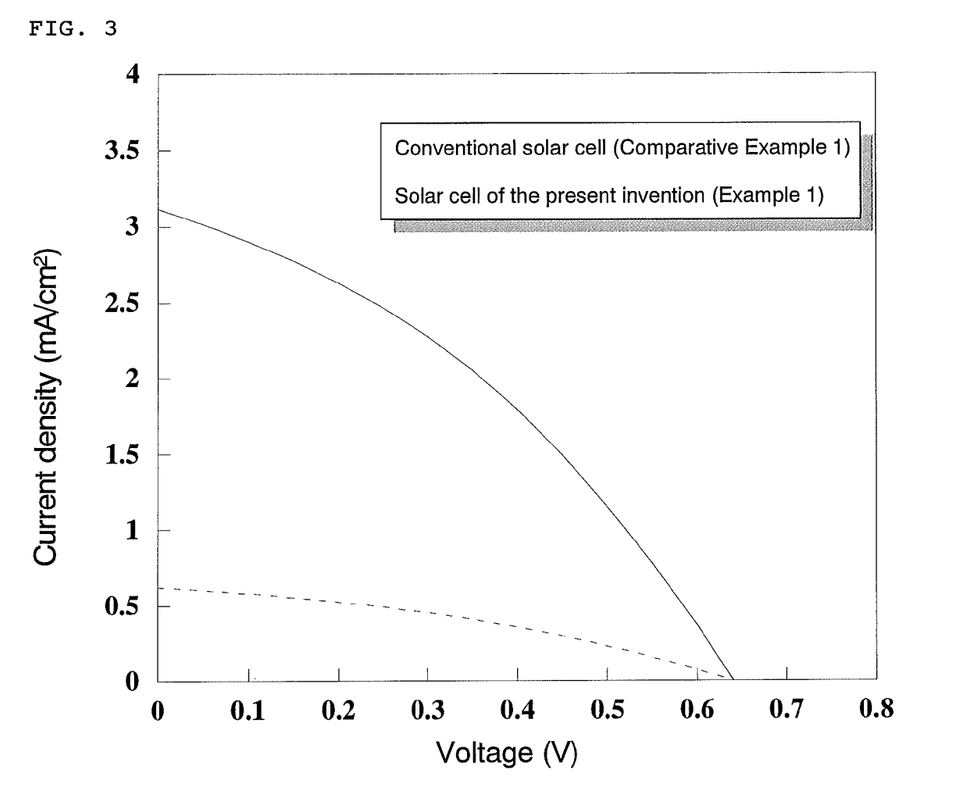
FIG. 3: A graph showing measurement results of current-voltage curves in Test Example 1.

The dye-sensitized solar cells according to Example 1 and Comparative Example 1 were irradiated with light of 100 mW/cm² using a solar simulator (product name: CLR-25, Bunkoukeiki Co., Ltd.). The current-voltage curve was measured, and the photoelectric conversion efficiency (η) was found for each cell. FIG. 3 shows the measurement results of current-voltage curves.

The results showed that the photoelectric conversion efficiency (photoelectric conversion characteristic) of the dye-sensitized solar cell of Example 1 (the present invention) was significantly higher than that of the known dye-sensitized solar cell (Comparative Example 1).

The dye-sensitized solar cell according to Example 2 (the present invention) showed a similar current-voltage curve to that of the dye-sensitized solar cell according to Example 1. Accordingly, it is confirmed that the dye-sensitized solar cell according to Example 2 also had a superior photoelectric conversion efficiency (photoelectric conversion characteristic).

REFERENCE NUMERALS

1. Light condenser
2. Titanium metal or titanium alloy substrate having an opening structure
3. Titanium oxide layer (semiconductor layer)
4. Electrolyte layer
5. Counter electrode
6. Transmission unit
7. Photoelectrode
8. Reflector
9. Prism

The invention claimed is:
1. A dye-sensitized solar cell comprising a photoelectrode and a counter electrode, which are oppositely disposed with an electrolyte layer interposed therebetween,
wherein:
(1) the photoelectrode is structured such that a semiconductor layer containing a dye sensitizer is formed on a titanium or titanium alloy substrate having an opening structure, and
(2) the photoelectrode comprises a light condenser that is disposed on the titanium or titanium alloy substrate;
(3) the light condenser comprises a light-condensing unit for condensing sunlight and a transmission unit for transmitting condensed sunlight to the photoelectrode;
(4) the light condensing unit includes at least one member selected from the group consisting of a light reflector and a prism; and
(5) a glass rod material is embedded in the titanium or titanium alloy substrate having an opening structure.

2. The dye-sensitized solar cell according to claim 1, wherein the titanium or titanium alloy substrate having an opening structure is a metal mesh or a lath material.

3. The dye-sensitized solar cell according to claim 1, wherein the semiconductor layer is a titanium oxide film formed by anodizing the titanium or titanium alloy substrate having an opening structure.

4. The dye-sensitized solar cell according to claim 3, wherein the titanium or titanium alloy substrate having an opening structure further comprising a titanium nitride, which is formed before the anodization.

5. The dye-sensitized solar cell according to claim 1, wherein the semiconductor layer is a titanium oxide sintered compact obtained by forming a coating film by applying a paste agent containing titanium oxide fine particles onto the titanium or titanium alloy substrate having an opening structure, and heat-treating the coating film.

6. The dye-sensitized solar cell according to claim 1, wherein the semiconductor layer is a laminated body of a titanium oxide sintered compact and a titanium oxide film, the laminated body being obtained by forming a titanium oxide film by anodizing the titanium or titanium alloy substrate having an opening structure, forming a coating film by applying a paste agent containing titanium oxide fine particles onto the titanium oxide film, and heat-treating the coating film.

7. The dye-sensitized solar cell according to claim 2 wherein the semiconductor layer is a titanium oxide film formed by anodizing the titanium or titanium alloy substrate having an opening structure.

8. The dye-sensitized solar cell according to claim 2 wherein the semiconductor layer is a titanium oxide sintered compact obtained by forming a coating film by applying a paste agent containing titanium oxide fine particles onto the titanium or titanium alloy substrate having an opening structure, and heat-treating the coating film.

9. The dye-sensitized solar cell according to claim 3 wherein the semiconductor layer is a titanium oxide sintered compact obtained by forming a coating film by applying a paste agent containing titanium oxide fine particles onto the titanium or titanium alloy substrate having an opening structure, and heat-treating the coating film.

10. The dye-sensitized solar cell according to claim 2 wherein the semiconductor layer is a laminated body of a titanium oxide sintered compact and a titanium oxide film, the laminated body being obtained by forming a titanium oxide film by anodizing the titanium or titanium alloy substrate having an opening structure, forming a coating film by applying a paste agent containing titanium oxide fine particles onto the titanium oxide film, and heat-treating the coating film.

11. The dye-sensitized solar cell according to claim 3 wherein the semiconductor layer is a laminated body of a titanium oxide sintered compact and a titanium oxide film, the laminated body being obtained by forming a titanium oxide film by anodizing the titanium or titanium alloy substrate having an opening structure, forming a coating film by applying a paste agent containing titanium oxide fine particles onto the titanium oxide film, and heat-treating the coating film.

\* \* \* \* \*